United States Patent
Kim et al.

(10) Patent No.: US 7,636,262 B2
(45) Date of Patent: Dec. 22, 2009

(54) SYNCHRONOUS MEMORY HAVING SHARED CRC AND STROBE PIN

(75) Inventors: Kyu-Hyoun Kim, Mount Kisco, NY (US); Paul W. Coteus, Yorktown, NY (US)

(73) Assignee: International Business Machines Corporation, Armonk, NY (US)

(*) Notice: Subject to any disclaimer, the term of this patent is extended or adjusted under 35 U.S.C. 154(b) by 223 days.

(21) Appl. No.: 11/923,691

(22) Filed: Oct. 25, 2007

(65) Prior Publication Data
US 2009/0113133 A1    Apr. 30, 2009

(51) Int. Cl.
*G11C 7/10* (2006.01)

(52) U.S. Cl. ............... 365/189.05; 365/200; 365/233.1; 365/193

(58) Field of Classification Search ............ 365/189.05, 365/200, 233.1, 193
See application file for complete search history.

(56) References Cited

U.S. PATENT DOCUMENTS

| | | | |
|---|---|---|---|
| 6,018,778 | A | 1/2000 | Stolowitz |
| 6,067,255 | A | 5/2000 | Jung et al. |
| 6,237,052 | B1 | 5/2001 | Stolowitz |
| 6,549,000 | B2 | 4/2003 | Ebiya |
| 6,715,096 | B2 | 3/2004 | Kuge |
| RE39,421 | E | 12/2006 | Stolowitz |
| 7,200,069 | B2 * | 4/2007 | Jang et al. ............... 365/233.1 |
| 2001/0014922 | A1 | 8/2001 | Kuge |

OTHER PUBLICATIONS

"Processor fits into pin-limited design," Integrated System Design, vol. 14, No. 153, p. 10-18.

* cited by examiner

*Primary Examiner*—Son Dinh
*Assistant Examiner*—Nam Nguyen
(74) *Attorney, Agent, or Firm*—Lynn L. Augspurger

(57) ABSTRACT

A memory system having a memory element chip (DRAM) and a memory controller chips having a plurality of drivers and receivers and latches for transferred data. For writes clocks, write data and write for CRC (cyclic redundancy checks) is transferred to the DRAM from the memory controller and latched for error checking. The reads are clocked and the read data is received and transferred to a read data latch with also receives a clocked read strobe for verification of data integrity from DRAM. Each chip has a bi-functional pin that acts as a shared CRC pin during write and acts as a shared strobe pin during READ. Data transfers with the CRC signal and DQS signal are transferred across two paths CRC0/DQS and CRC1/DQS1. One could also transfer the CRC signal across one path with only the CRC0/DQS signal. Read operations have no CRC, and have no need for CRC because transfer errors during read can be detected by memory error correction coding (ECC). Write data provides source synchronous I/O data to said memory element chip needed for modem high speed memory communications.

20 Claims, 5 Drawing Sheets

SYNCHRONOUS MEMORY HAVING SHARED CRC AND STROBE PIN

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to memory interface communication, and particularly to transfers of cyclic redundancy codes and strobes which allow a user better direct control of a DIMM and its function.

2. Description of Background

Before our invention a conventional memory interface between a memory control and a DIMM used bi-directional strobes. However, error control coding such as use of cyclic redundancy checks (CRC) has become desirable due to the increasing data-rate transfers and consequent bit error rates (BER).

SUMMARY OF THE INVENTION

The shortcomings of the prior art are overcome and additional advantages are provided through the provision of a bi-functional pin for write CRC and read strobe.

The memory system and computer controller corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which can effectively achieve the results of two measurement techniques using the same bi-functional pins for data paths.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
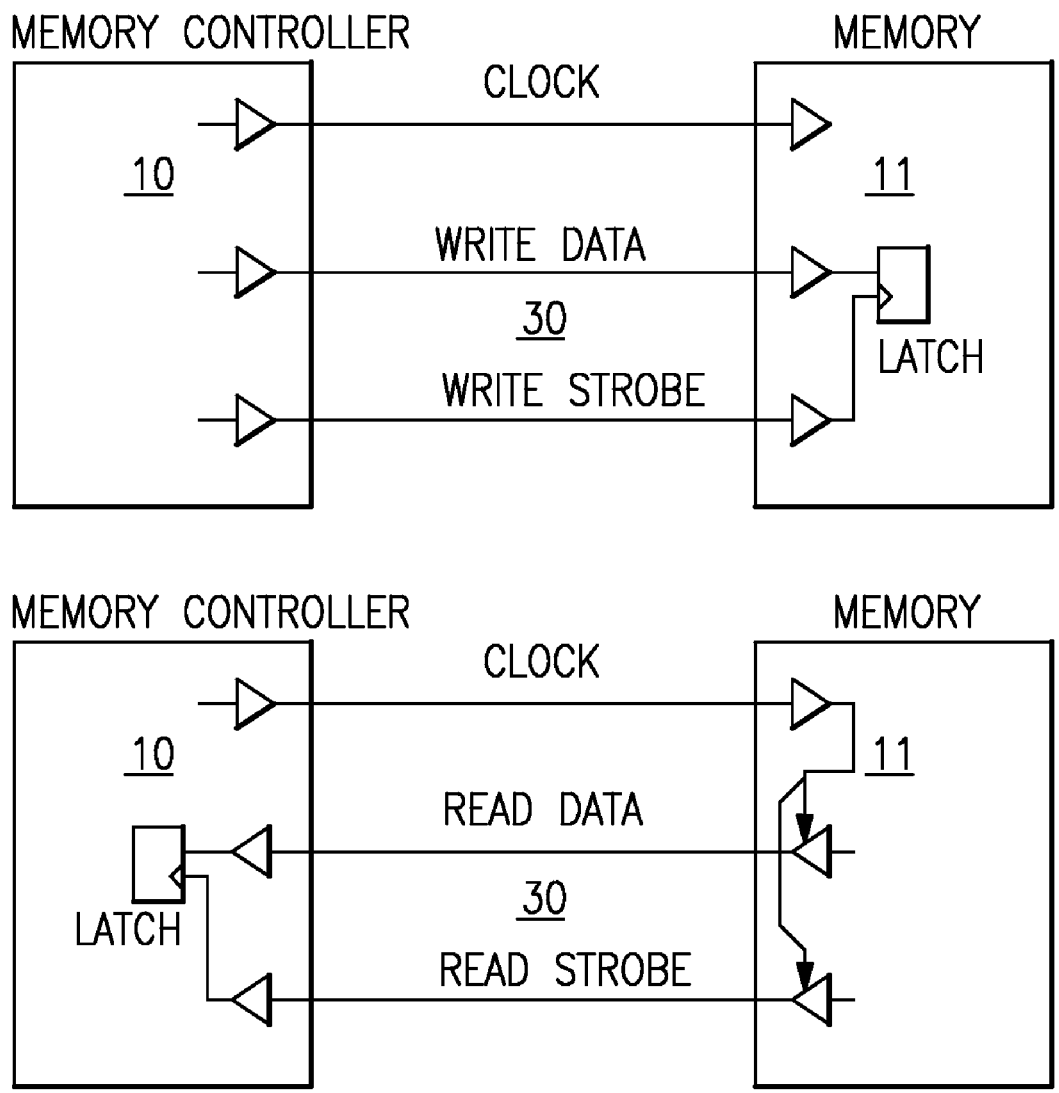
FIG. 1 illustrates write data and read data images of one example of a memory system and controller which has strobe connection but without having the ability to performing cyclic redundancy checks.

Turning now to the drawings in greater detail, it will be seen that in FIG. 1 there is illustrated a memory controller 10 and a memory storage device (DRAM or DIMM of DRAMs) 11 which have a data communication bus 30 there between. The illustrated coupling of FIG. 1 has no CRC pins but has strobe pins. The memory controller and the DRAM have latches which are used for the timed signals (which are timed by the Clock signal) being transmitted from one element to the other, from the driver in the Memory controller to the receiver in the memory chip. In the case of a strobe, the strobe signal becomes a timed input to the memory chip's latch for data, be it read or write. In each of the illustrated diagrams, the memory controller and DRAM each have three pins. In FIG. 1 there are as illustrated, pins for Clock, Data, and Strobe.

Figure 2:
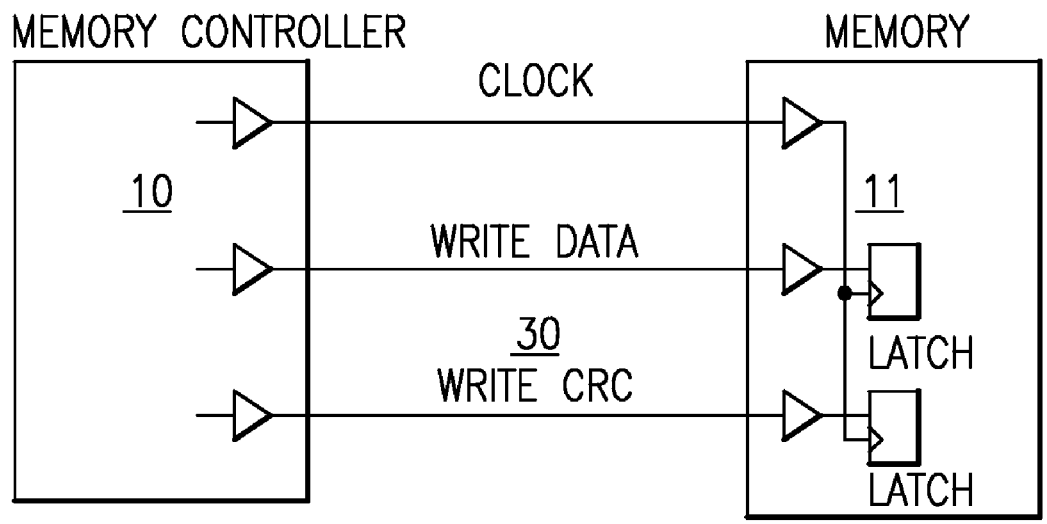
FIG. 2 illustrates write data and read data images of one example of a memory system and controller which has the ability to have cyclic redundancy checks but without having the ability of performing strobes.
Figure 2:
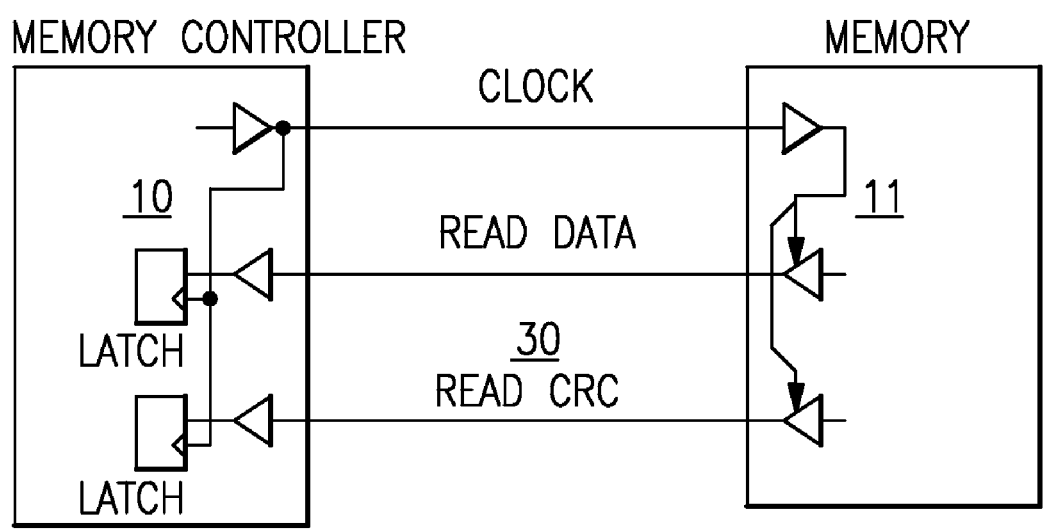

As see by FIG. 2 a memory controller 10 and a memory storage device (DRAM or DIMM of DRAMs) 11 which have a data communication bus 30 there between can also have CRC pins instead of strobe pins. In the case of a CRC latch, the controller driver supplies the CRC signal which becomes an input to memory receiver and the CRC latch which is timed by the Clock timing the data and CRC latches for write, and read. Again, in each of the illustrated diagrams, the memory controller and DRAM each have three pins. In FIG. 2 there are as illustrated, pins for Clock, Data, and CRC.

Figure 5:
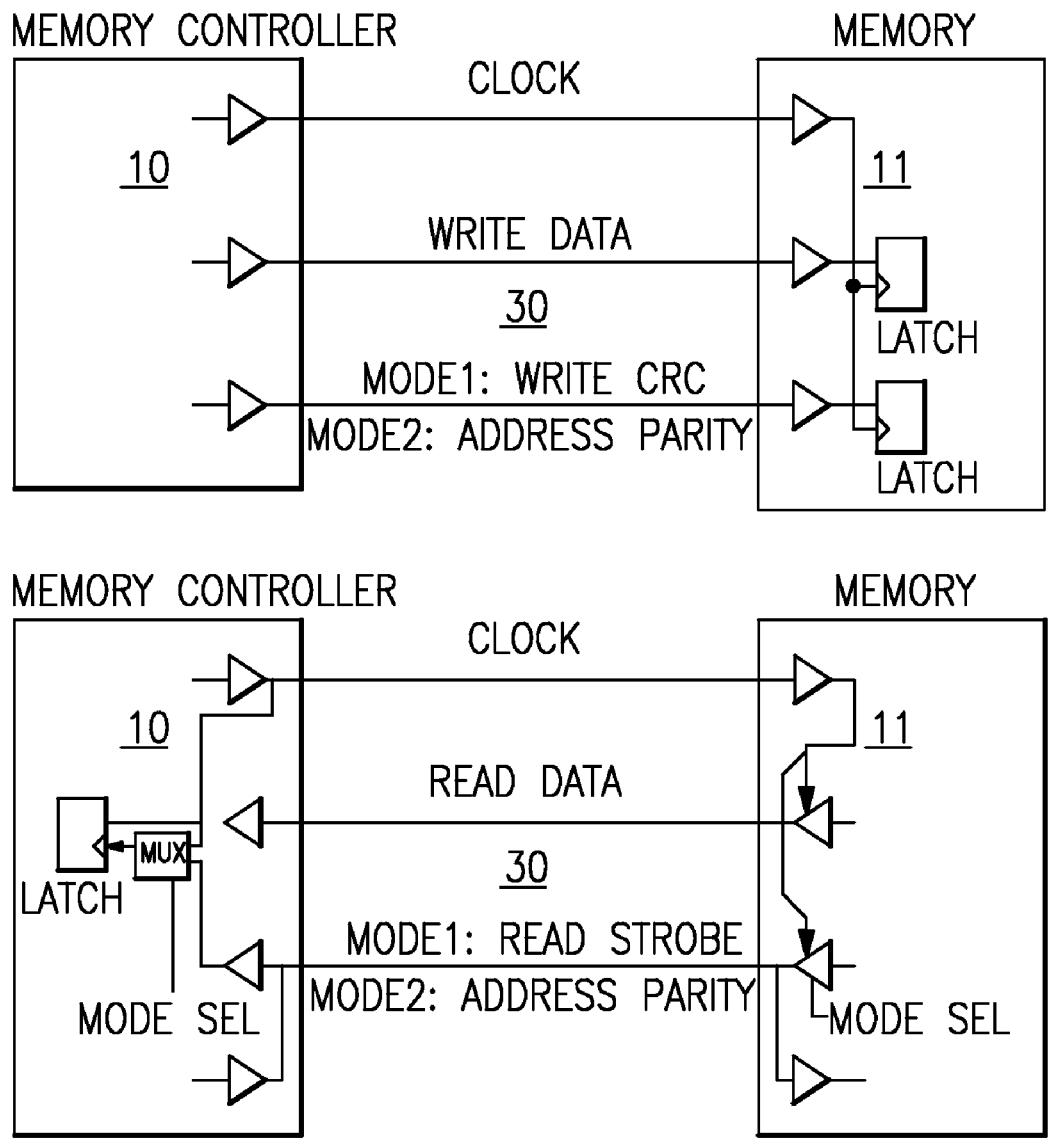
FIG. 5 illustrates an embodiment where the bi-functional pin path will be selectively used as either common-CRC-strobe or dedicated Address parity.

I/O Error control coding such cyclic redundancy check (CRC) coding becomes more necessary for memory interfaces now due to the need for increasing data-rate transfers to and from memory and its consequent increasing bit error rate (BER). To transfer CRC, additional pins would be required, but, pin count increases would raise the overall system cost. Therefore, it is very expensive to have both CRC pins and strobe pins at the same time. The solution illustrated to satisfy the need is illustrated in FIG. 3 and FIG. 5, where there is no need to choose between having strobe without CRC (FIG. 1) and having CRC giving up strobe (FIG. 2) as in the other diagram shown in FIG. 2.

As can be seen in FIG. 2, the read path has a large turn around time difference between CLK (clock signal) and DATA paths at Memory Controller receiving latch. Therefore, FIG. 2 communications have large jitter at the receiving latch during the READ mode. Write is not affected much by removing write strobe because Clock and Write data has similar flight time so the upper illustration of FIG. 2 can be still regarded as a source synchronous I/O.

Figure 3:
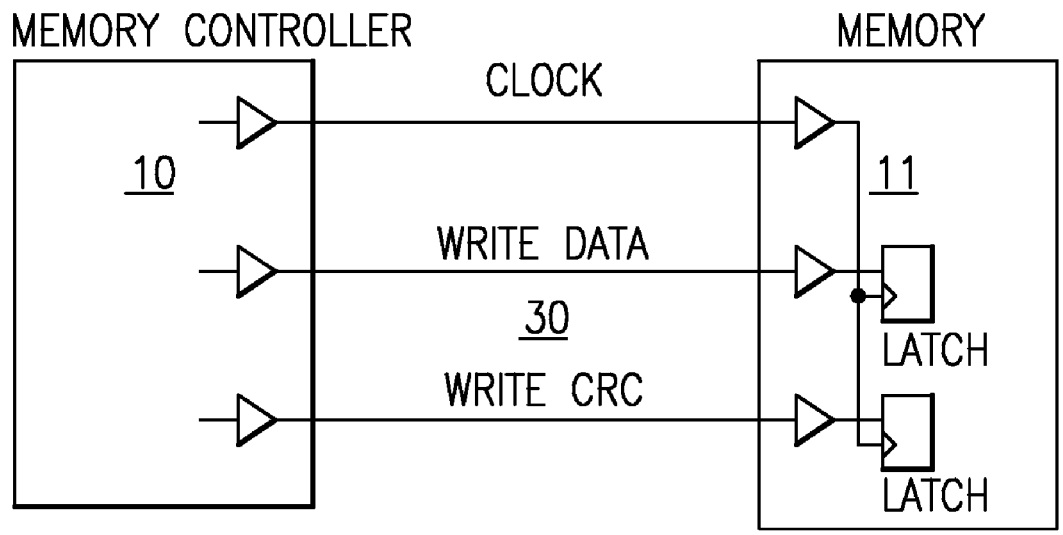
FIG. 3 illustrates write data and read data images of the preferred embodiment of the invention illustrative the bi-functional pin path between the memory controller and the memory (DIMM) of a storage system.
Figure 3:
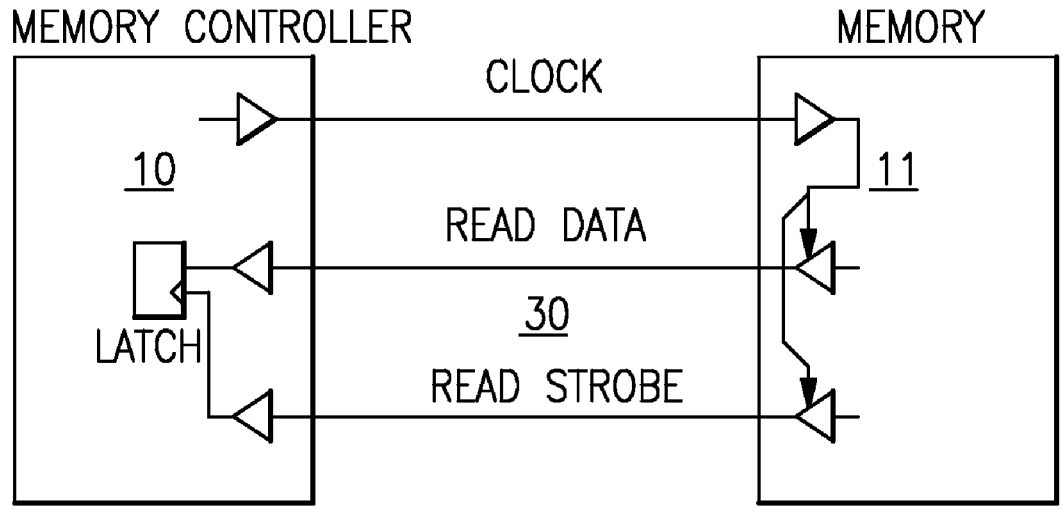

FIG. 3 shows the preferred embodiment of the memory system having a memory controller and memory chip device in which the memory (DRAM or DIMM pin) interface includes a bi-functional pin for write CRC coupled with a read strobe. In this embodiment, write has still source synchronous I/O needed for modem high speed memory communications. So even when timing has the same amount of jitter level at memory receiver as with the diagram of FIG. 2, the write CRC can detect a transfer error due to high speed data rates, so it can guarantee overall system reliability. In FIG. 3 for the CRC latch, the CRC signal from the memory controller driver becomes an input to the CRC latch which is timed by the Clock timing the data and CRC latches for write. In the case of a strobe, the strobe signal becomes a timed input to the latch for data read. Again, in each of the illustrated diagrams, the memory controller and DRAM each have three pins. In FIG. 3 there are as illustrated, pins for Clock, Data, and a bi-functional pin for write CRC and read strobe.

Read as illustrated by FIG. 3 has still a strobe signal so the amount of jitter at memory controller receiver during read is not affected. But, read has no CRC, and has no need for CRC. This is because any transfer error during read can be detected by other means, such as by memory error correction coding (ECC) and so this feature can be used with memory supplied by IBM with its ECC which is part of the illustrated embodiment. Therefore, in case of read transfer error, the memory controller can detect any errors and can and will re-issue the read command until it does not find any transfer error.

Write is not be protected by memory ECC, because ECC error detection would be detected only when the data is read back. In this case, it is too late for memory controller to re-issue the write command.

In other words, memory ECC scheme can protect against read transfer errors, but need not detect write transfer errors. And, data latching using the clock signal is source synchronous only for write operation.

Using these facts, write is okay and sufficient to pass error free signals without write strobe only if the receiver chip has write CRC, and read is okay and sufficient to pass error free signals without read CRC only if it has read strobe and ECC.

Therefore, we have defined the bi-functional pin that acts as a shared CRC pin during write and acts as a shared strobe pin during READ.

Figure 4:
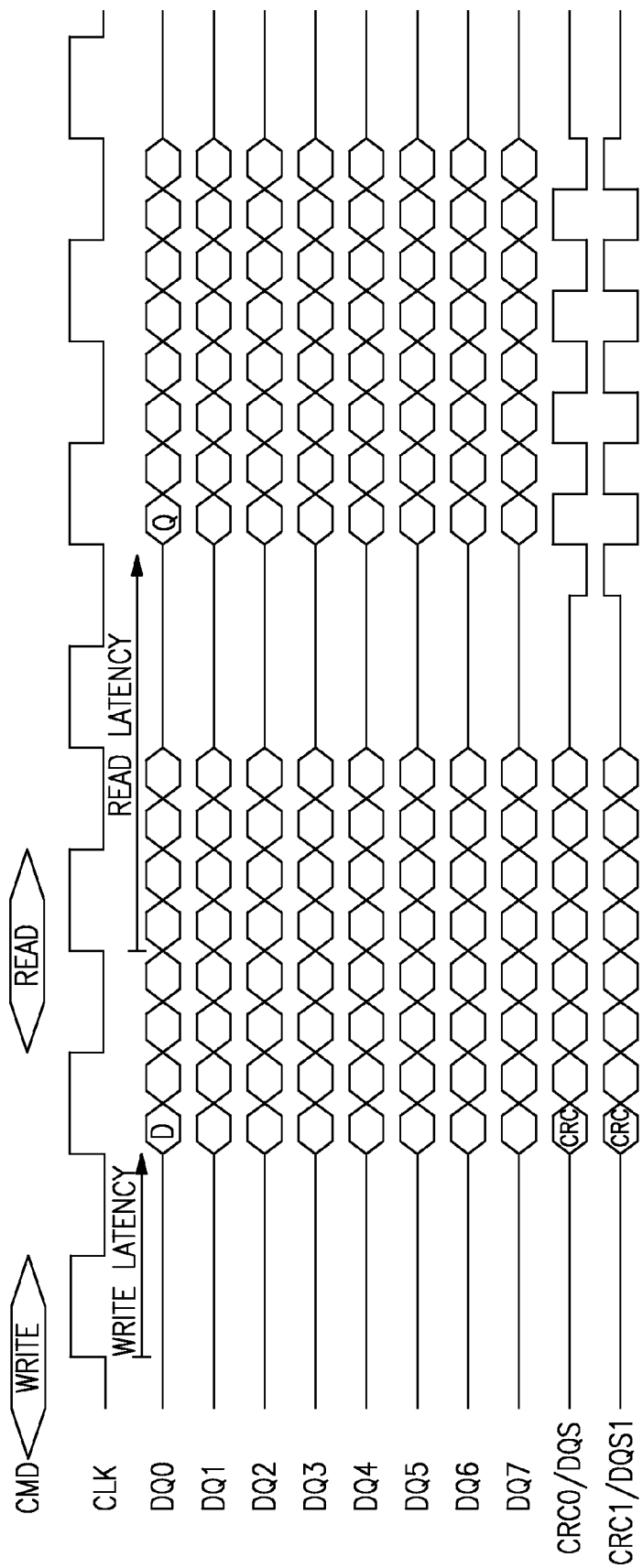
FIG. 4 illustrates the timing of test sequences in using the invention illustrated by FIG. 3.

FIG. 4 illustrates a data transfer in which the CRC signal and DQS signal are transferred across two paths CRC0/DQS and CRC1/DQS1 as shown in FIG. 4. One could also transfer the CRC signal across one path with only the CRC0/DQS signal. (Only the upper CRC transmission line for CRC shown in FIG. 4.)

FIG. 5 illustrates an embodiment where the bi-functional pin path will be selectively used as either common-CRC/strobe or dedicated Address parity.

When the data bus speed goes higher, the Address bus speed also increases. Usually the address bus speed is the half or ¼ of the data bus speed. But, once there is an error in address bit, its effect is more catastrophic than an error in data bus. So, it's useful to have an error detection scheme for address bus, too. But it requires one or more pins.

In FIG. 5, the one signal pin can be used for either address parity transfer, write CRC transfer or read strobe transfer. Address parity is transferred during both read and write transactions, and even during row activation commands. So, the address parity is not time-multiplexed with other tests (CRC or strobe). Its transmit direction is from the memory controller to a memory element device (DRAM). In FIG. 5 for there are as illustrated, pins for Clock, Data, and a bi-functional pin for write CRC and read strobe, the common-CRC/strobe pin or dedicated Address parity pin for the alternative mode.

If a system decides that the data bus is lightly loaded thus it doesn't expect much error on data bus but rather worries about address errors. It can choose mode-2 at the initialization period, and continue to use the pin as a dedicated address parity transfer. The driver in DRAM is configured to be disabled permanently in The driver in DRAM is configured to be disabled permanently in the mode-2 dedicated address parity mode.

If a system decides to protect data transfer errors and gives up detection of address errors, it can select mode-1 with CRC/strobe functions but without address parity transfers and it will functionally become same as the embodiment of FIG. 3.

The diagrams depicted herein are just examples. There may be many variations to these diagrams or the steps (or operations) described therein without departing from the spirit of the invention. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A memory element chip comprising:
a memory storage device having a plurality of drivers and receivers, and a first receiver coupled to a first latch for receiving write data, a second receiver coupled to a second latch for receiving cyclic redundancy check (CRC) signals, and a third receiver coupled to both of said first and second latches for clocking the write data and said CRC signals received in said memory storage device, said memory storage device having a bi-functional coupling pin coupled to said second latch for passing output driven from said memory storage device over a bi-functional pin path which output is a different function output for data integrity different from that of said CRC signals sent out over said bi-functional pin.

2. The memory element chip according to claim 1 wherein said different function output for data integrity different from that of said CRC signals is a strobe function output.

3. The memory element chip of claim 2 wherein read operations have no CRC, and have no need for CRC because transfer errors during read can be detected by memory error correction coding (ECC).

4. The memory element chip of claim 3 wherein write data provides source synchronous I/O data to said memory element chip needed for modern high speed memory communications.

5. The memory element chip of claim 4 wherein said bi-functional pin path is selectively used as either a common CRC/strobe bi-functional pin path or a path for dedicated address parity.

6. A memory controller comprising:
a memory controller device having a plurality of drivers and receivers, and a first driver coupled to a first latch for sending write data, a second driver coupled to a second latch for sending write CRC signals, and a third driver for sending a clock signal for clocking the write data and CRC signals sent from said memory controller, said memory controller device having a bi-functional coupling pin coupled to said second driver for passing output driven from said memory controller device over a bi-functional pin path which write CRC output is a different function for data integrity different from that of received signals passed over said same bi-functional pin.

7. The memory controller according to claim 6 wherein said received signals passed over said same bi-functional pin path provides a strobe function.

8. The memory controller according to claim 7 wherein said bi-functional pin path is selectively used as either a common-CRC/strobe pin path or for dedicated address parity.

9. The memory controller according to claim 8 wherein said address parity is transferred during both read and write transactions, and even during row activation commands.

10. The memory controller according to claim 9 wherein the address parity is not time-multiplexed with other tests (CRC or strobe) and wherein said address parity transmit direction is from said memory controller to a memory element device.

11. The memory controller according to claim 10 wherein when a data bus is lightly loaded and errors on said data bus are unlikely, but address errors are of great concern, a dedicated address parity mode is chosen at the initialization period of transfer to determine the use of the bi-functional pin as a dedicated address parity transfer.

12. The memory controller according to claim 10 wherein the driver in DRAM is configured to be disabled permanently in said dedicated address parity mode.

13. The memory controller according to claim 10 wherein a system cam protect data transfer errors and give up detection of address errors, by selecting a CRC/strobe mode without address parity transfers.

14. The memory controller according to claim 10 wherein a data transfer in which a CRC signal and a DQS signal are transferred across two paths CRC0/DQS and CRC1/DQS1 is provided for said memory controller.

15. The memory controller according to claim 10 wherein a transfer of said CRC signal across one path with only a CRC0/DQS signal provided.

16. A memory system, comprising:
a memory controller device having a plurality of drivers and receivers, and a first driver coupled to a first latch for sending write data, a second driver coupled to a second latch for sending write CRC signals, and a third driver for sending a clock signal for clocking the write data and CRC signals sent from said memory controller, said memory controller device having a controller bi-functional coupling pin coupled to said second driver for passing output driven from said memory controller device over a bi-functional pin path which write CRC output is a different function for data integrity different from that of received signals passed over said controller bi-functional pin, and
a memory storage device having a plurality of drivers and receivers, and a first receiver coupled to a first latch for receiving write data, a second receiver coupled to a second latch for receiving cyclic redundancy check (CRC) signals, and a third receiver coupled to both of said first and second latches for clocking the write data and said CRC signals received in said memory storage device, said memory storage device having a memory bi-functional coupling pin coupled to said second latch for passing output driven from said memory storage device over said bi-functional pin path which output is a different function output for data integrity different from that of said CRC signals sent out over said memory bi-functional pin over said bi-functional pin path to a receiver in said memory controller coupled via its controller bi-function pin.

17. The memory system according to claim 16 wherein said bi-functional pin path is used as a common-CRC/strobe pin path.

18. The memory system according to claim 16 wherein said bi-functional pin path is selectively used as either a common-CRC/strobe pin path or for dedicated address parity.

19. The memory system according to claim 16 wherein read operations have no CRC, and have no need for CRC because transfer errors during read can be detected by memory error correction coding (ECC).

20. The memory system according to claim 19 wherein write data provides source synchronous I/O data to said memory element chip needed for high speed memory communications.

* * * * *